Patented Oct. 28, 1952

2,615,905

UNITED STATES PATENT OFFICE 2,615,905

RECOVERING VALUABLE COMPONENTS FROM OIL BEARING SEEDS, AND PRODUCTS THEREFROM

Walther Georg Heinrich Forstmann, Berlin-Tempelhof, and Guenther Hillmann, Tuebingen, Germany, and Erich M. H. Radde, New York, N. Y.

No Drawing. Application October 30, 1950, Serial No. 193,024. In Germany October 31, 1949

9 Claims. (Cl. 260—412.4)

This invention relates to an improvement in recovering valuable components from oil bearing seeds and the like material, and more particularly to processes for debittering and enriching the protein content of such material as well as for simultaneously debittering and de-oiling oil seed and the like material containing bitter components, and to products obtained thereby. Said processes are especially suitable for the treatment of lupine seeds.

It is well known that the seeds of the bitter lupine (*Lupinus angustifolius* and others) can not be used for animal feeding nor for human consumption although their protein content is quite high (about 40%) and although the lupine protein has a remarkably high biological value. This is due to the presence of considerable amounts of bitter and toxic components in said seed.

Attempts have been made to cultivate sweet lupines whereby seeds are obtained which possess only small amounts of bitter and toxic components. Although said sweet lupines can be used as such for animal feeding, the cultivation of said plant has some disadvantages. First of all, the sweet lupine requires a better soil than the bitter lupine. But lupines are generally grown on less fertile soil in order to improve said soil by the nitrogen-fixing bacteria living in symbiosis with the lupine and forming nodules on their roots. Hence, to grow sweet lupines instead of bitter lupines does not solve the problem in question. Furthermore, the sweet lupine seeds still contain small amounts of bitter tasting components which, although they are so small that the seed can be used without any danger as fodder for larger animals, render the same unfit for human consumption and for feeding younger animals. In order to obtain a foodstuff suitable for all purposes and also for human consumption from sweet lupine seed, it must also be debittered.

Debittering of lupine seed has already been carried out before. Thus, by autoclaving the lupines with steam part of the bitter components are decomposed but the bitter toxic compounds remain unaffected. Furthermore, part of the protein is converted into the water-soluble amide form and is lost in the course of the process. Lixiviating with cold water or with salt water has been practiced since old times; but it also does not yield completely debittered lupines. Furthermore large amounts of soluble nutrients are dissolved thereby and are lost with the lixiviating water. Other known processes for debittering lupines possess also great disadvantages. But most important of all, none of the known processes effects simultaneous debittering and de-oiling.

It is one object of this invention to provide such a process allowing simultaneous debittering and de-oiling of sweet and especially of bitter lupines without in any way affecting the nutritional value of the lupine protein. Such a process will become of great importance because it is possible to cultivate lupines the seeds of which contain considerable amounts of oil (up to 18%).

Another object of this invention consists in extracting the lupine seeds with organic solvents and more particularly with mixtures of solvents which are capable of extracting not only the oil from said seed but also other components, such as phosphatides, like lecithin, sterols, and, of course, all the bitter components including the alkaloids.

A further object of this invention is to provide an extraction residue of said lupine seeds which has a high protein content, its protein being of high biological value and of good digestibility, said residue being free from any bitter and toxic components so that it is suitable not only as animal fodder but also as human foodstuff.

A still further object of this invention is to provide an extract from said lupine seeds and to separate and isolate therefrom the oil content, the phosphatides, sterols, bitter components, and alkaloids.

Another object of this invention consists in subjecting not only lupine seeds but also other oil seeds containing bitter and toxic components, such as rape seed, mustard seed, cotton seed, beech nuts, soy beans, corn and other grain germs, and the like, to the simultaneous debittering and de-oiling process according to this invention whereby also an extraction residue is obtained which might be used not only for animal but also for human consumption. The process is especially suitable for removing the mustard oil glycosides from rape and mustard seed, gossypol from cotton seed, the toxic components from beech nut, and the like.

Still another object of this invention consists in enriching the protein content of oil seeds and their press cakes and extraction residues and removing the bitter components therefrom. This process may be used in connection with the ordinary de-oiling procedure by means of expressing or extracting methods. The protein enriching process may be applied to residues obtained by simultaneously debittering and de-oiling oil seeds.

These and other objects of this invention will be apparent from the specification and the examples given hereinafter.

The process of removing the bitter tasting components from oil seeds and their press cakes and extraction residues and of enriching the protein content of the same consists in principle in extracting the crushed seeds with water-miscible organic solvents which contain only such amounts of water that the bitter tasting components, such as the so-called tanning compounds and the alkaloids, are dissolved while the protein remains substantially undissolved. When using suitable mixtures of water-miscible solvents and water, it is possible to dissolve at the same time part of the carbohydrates also, thus producing an extraction residue which is considerably enriched in its protein content.

Polar solvents are especially suitable for this purpose. A preferred polar solvent is ethanol containing from about 10% to about 50% of water. The water content of the solvent depends upon the amount of bitter components to be removed. In the case of sweet lupines, for instance, with a very low content of bitter components it is possible to use an alcohol of high concentration, such as 90% ethanol, whereby the losses of protein are kept almost negligible, while with bitter lupines the use of an alcohol of higher water content, for instance, 50% ethanol, yields better debittering results. Other polar water-miscible organic solvents, such as methanol, dioxane, acetone and the like, may be used likewise although aqueous ethanol has proved to be especially effective. It is possible to increase the water content of said solvents still more by reducing their power of dissolving the proteins by the addition of suitable salts soluble in said solvents, whereby said salts have a salting out effect upon the protein. For instance, aqueous alcohol with 70% of water containing sodium chloride, ammonium sulfate and other salts having a salting out effect upon the proteins, may also be used instead of the pure aqueous alcohol solutions.

In order to carry out this process of debittering the seed and enriching its protein content, the crushed seed or flour therefrom is first moistened with a certain amount of water whereafter the necessary amount of organic solvent of high concentration is added to the moistened seed or flour so as to obtain a water-solvent mixture of the desired concentration. Proceeding in this manner has the further advantage that the crushed seed or flour does not become sticky and does not form lumps. Hence, after extraction the solvent can be easily separated from the extraction residue. Sometimes it is possible and of advantage to carry out the extraction of the seed during the grinding and milling operations.

In order to further increase the protein content of the extracted residue, the starch may be separated from the protein before or after extraction by customary methods, for instance, by steeping the seed flour in water to burst the cells, macerating in roller mills, mixing with water, sieving through screens and bolting cloth, and fractional settling. It is also possible to subject the ground seed or flour therefrom to the action of amylolytic enzymes which split up the starch into soluble carbohydrates of lower molecular weight, said soluble carbohydrates being much more readily separated from the seed than the water-insoluble starch.

When working with aqueous organic solvents, the oil content of the seed, of course, is not extracted but remains with the protein. It can, however, in a known manner be removed by expressing the same or by extracting the residue with water-insoluble agents capable of extracting fats and oils, such as ether, benzene, petroleum ether, trichloroethylene and others.

By dissolving the remaining protein in suitable solvents, for instance, in dilute acids or with calcium hydroxide respectively and by reprecipitation from said solutions by means of neutralizing agents, such as sodium hydroxide or carbonate or hydrochloric acid respectively, a comparatively pure protein is obtained which may find manifold application in the food industry as well as for technical purposes. The protein solutions, of course, may also be further purified by electroosmotic or other purifying processes.

A great improvement over said process of debittering the oil seeds and of simultaneously enriching its protein content is achieved by the process of simultaneously debittering and de-oiling said material according to this invention. This new and improved process consists in principle in extracting the preferably crushed oil seed with a mixture of solvents capable of forming with water a ternary azeotropic mixture. Especially suitable for this purpose are mixtures consisting of water, water-miscible polar organic solvents, such as ethanol, methanol, dioxane, acetone and the like, and substantially in water not soluble lipophilic organic solvents, i. e. solvents capable of dissolving fats and oils, such as benzene, petroleum ether, carbon tetrachloride, trichloroethylene, chloroform and the like. Said lipophilic solvents must be soluble in said polar water-miscible solvents. Especially suitable are mixtures of benzene, ethanol, and water which are capable of forming a ternary azeotropic mixture, such a mixture containing about 74.0% of benzene, 18.3% of ethanol, and 7.7% of water, said mixture boiling about at 64.9° C. Preferably, however, mixtures with a higher alcohol content are used because the above mentioned ternary mixture separates at lower temperatures into two layers. On the other hand, the alcohol content of the mixture should not be too high; for, due to the high heat of evaporation of alcohol (205 cal.) and of polar solvents in general, in contrast to the low heat of evaporation of benzene (93 cal.), the heat balance would be uneconomical with too much alcohol. A solvent mixture containing 75% of benzene, 21% of ethanol, and 4% of water has proved to be especially effective.

Solvent mixtures of such and similar composition effect complete debittering and simultaneously complete deoiling of the lupine seed while according to the known processes this could only be achieved, if at all, in a two step process. As a further advantage of this process there may be mentioned the fact that the overall losses in nutritive material are considerably lower than with the known processes.

The starting material to be used for the processes according to this invention consists preferably of seed from which the shells have been removed prior to extraction. The removal of the shells and at the same time of a larger amount of the fiber content of the seed is carried out by methods known to the art, for instance, by crushing the seed and subjecting it to a classification process by vibration, by wind sifting and the like. Instead of crushing the seed and of loosening thereby the shells they may advantageously be removed by subjecting the seed to a flash-scorching process whereby they are exposed for a very few seconds to the effect of high temperature so that only the outer shell is burned and can be removed readily because the steam development directly underneath the shell raises and separates the latter from the seed core which is not substantially affected by the brief heat treatment. Of course, other suitable methods and means for removing the shells from the seeds to be treated may also be used.

In order to achieve rapid and complete debittering or debittering and de-oiling at the same time, the material is preferably used in a finely divided state. A flour the particles of which do not exceed at the most 1.5 mm. in diameter has proved to be especially suitable, but finer material may also be employed. With coarser material the extraction requires more time than with finer one; but the removal of the solvents can be accomplished more readily than with the latter.

The extraction process may be carried out in continuous operation or in batches, i. e. discontinuously. Extraction apparatus as they are customarily used in oil mills are quite suitable. The removal of the solvent traces remaining in the extracted residue is preferably achieved by treatment with superheated and dry steam or with a hot air current or by vacuum distillation. Care has to be taken that the losses in solvents are kept as low as possible; for, the economy of the process depends to a large extent upon as complete a recovery of the solvents as possible.

The processes of this invention have proved to be especially advantageous for the treatment of the bitter lupine seed, because there exists no other economical method of converting said seed into a valuable foodstuff completely devoid of any bitter components, while its protein content is even increased in the extraction residue. Of course, certain changes and variations in the preparation of the starting materials for the treatment and in carrying out the processes are to be made depending on the different properties of the starting material to be used.

The extraction residues may be worked up in any desired manner. They may be milled and blended with other kind of flour. Debittered and de-oiled lupine flour, for instance, is added with advantage to wheat or rye flour. An addition of only 10% of said lupine flour increases the protein content of bread baked from said mixture from about 6% to about 10%, thus "fortifying" the same, without affecting the baking properties of said flour mixture. Likewise debittered and de-oiled lupine flour may be used in the manufacture of noodles, macaroni and the like. When isolating the lupine protein according to methods described above, one may obtain a product which can find manifold application for food and various technical purposes.

When simultaneously debittering and de-oiling lupine seeds, a lupine flour is obtained which contains only small amounts of oil. Hence, such a product is much more stable than any lupine flour which still contains oil; furthermore it does not turn rancid on storage as easily as the oil containing material. Its protein content is also about 7.5–15% higher than that of the starting material.

The extracts obtained by subjecting the oil-bearing starting material to the processes according to this invention may be worked up in any desired manner. The extract obtained, for instance by simultaneously debittering and de-oiling lupine seeds according to this invention, contains not only the lupine oil, but also phosphatides, like lecithin, sterols, bitter components, and various alkaloids which can be separated into compounds having valuable therapeutic properties. In order to recover said components of the extracts first the solvent mixture is removed by distillation, at the end in a vacuum. It is recovered and can be used for extracting a new charge of the starting material. The distillation residue is then subjected to a distillation with steam, preferably with superheated steam whereby the volatile alkaloids are distilled off. The aqueous distillate is then extracted preferably with chloroform, the chloroform is distilled off from the extract, and the residue is dissolved in dilute hydrochloric acid, filtered, and reprecipitated by the addition of sodium hydroxide or carbonate. Further purification and separation of the various alkaloids present in lupine seeds may be carried out in a manner known to the art.

It is, of course, also possible to extract the alkaloids from the oily residue by treating with dilute hydrochloric or sulfuric acid which dissolve them while the remaining phosphatides and sterols may be separated from the oil in a manner known in the art.

The following examples serve to illustrate the invention without, however, limiting the same to them.

Example 1

250 g. of de-shelled sweet lupine flour are extracted with a solvent mixture of 75% of benzene, and 25% to 94% ethyl alcohol in a Soxhlet apparatus until the extract is colorless and does not contain any bitter components. The solvent remaining in the extraction residue (about 200–250 cc.) is removed by vacuum distillation at 60° C. 225 g. of a debittered lupine flour are obtained.

When debittering bitter lupines, preferably small amounts of ammonia are added to the solvent mixture. It has been found that an addition of 1% of ammonia is sufficient. Thereby the speed with which debittering takes place is increased and in many cases only by this addition complete debittering is effected. Instead of ammonia other volatile bases may be added. Ammonia, however, is especially suitable on account of its low price and its ready availability.

Example 2

300 g. of bitter lupine flour are extracted several times with each 900 cc. of a solvent mixture consisting of 74% of benzene, and 26% of 93% ethyl alcohol, to which mixture 1% of ammonia gas has been introduced. The extraction is repeated until the flour is completely debittered. After drying and removing the adhering traces of solvents by steam treatment 235 g. of a debittered lupine flour are obtained.

Example 3

100 g. of rape seed press cake are extracted in a Soxhlet apparatus with 250 cc. of a mixture of 75 parts of benzene, 23 parts of 91.5% ethyl alcohol, and 2 parts of water until the extract is colorless and the residue is completely debittered. The extracted rape press cake is then freed from remaining solvents by treatment with steam or by vacuum distillation and is dried.

Example 4

100 g. of crushed cotton seeds are extracted in a Soxhlet apparatus with a solvent mixture consisting of 75% of trichloro ethylene, 22% of ethyl alcohol (95%), and 3% of water. A material is obtained which is freed of its toxic content and may be subjected to further milling.

*Example 5*

100 g. of bitter lupine flour are extracted in a Soxhlet with a solvent mixture consisting of 75% of carbon tetrachloride, 22% of 96% ethyl alcohol, and 3% of water to which 1% of ammonia gas has been introduced, until the starting material is completely debittered.

The extract is evaporated, after most of the solvent has passed over, in a vacuum. The residue is thoroughly shaken with a 5% solution of hydrochloric acid several times until no alkaloid can be extracted any more from the oil. The acid water extract is then neutralized by the addition of sodium hydroxide and subjected to a distillation with superheated steam of 120° C. The distillate is several times extracted with chloroform. The residue obtained from the chloroform extract after evaporating the chloroform contains the alkaloids and can be worked up in order to separate the individual alkaloids present.

*Example 6*

100 g. of sweet lupine flour are heated with 500 cc. of 90% ethyl alcohol under reflux and while stirring continuously. After boiling the mixture for 15 minutes the mixture is filtered by suction and the treatment is repeated until the solvent is colorless and the extraction residue is free of bitter components. Usually two treatments sufficient to obtain a completely debittered product.

*Example 7*

100 g. of bitter lupine flour are extracted in a Soxhlet with 500 cc. of 50% methanol until the extract is colorless and does not contain any bitter components. The extraction residue is then freed from remaining solvent and represents a product suitable for feeding cattle.

*Example 8*

100 g. of rape seed extraction residue are treated several times at 40–50° C. with 85% ethyl alcohol until the extract does not contain any bitter components.

Of course, many changes and variations may be made by those skilled in the art, in the reaction conditions, the solvents used, the kind of starting material employed, the extraction duration, the apparatus used, the methods of working up the extracts as well as the extraction residues, the means for recovering the solvents and the like, in accordance with the principles set forth herein and in the claims annexed hereto.

What we claim is:

1. In a method of simultaneously debittering and deoiling lupine seed, the steps comprising extracting said lupine seed with a mixture of two organic solvents and water, said two solvents forming with water a ternary azeotropic mixture, the water content of said solvents-water mixture not exceeding the water content of such a ternary azeotropic mixture, said solvents-water mixture containing a volatile base, and separating the extract from the extracted proteinaceous residue.

2. In a method of simultaneously debittering and deoiling lupine seed, the steps comprising extracting said lupine seed with a mixture of a water miscible, polar organic solvent and a lipophilic solvent and water, said polar organic solvent and said lipophilic solvent forming with water a ternary azeotropic mixture, the water content of said solvents-water mixture not exceeding the water content of such a ternary azeotropic mixture, said solvents-water mixture containing a volatile base, and separating the extract containing oil, lecithin, sterols, bitter components, and alkaloids present in said lupine seed, from the extracted proteinaceous residue.

3. In a method of simultaneously debittering and de-oiling lupine seed according to claim 2, wherein the polar organic solvent is a water-miscible alcohol and the lipophilic solvent is a hydrocarbon.

4. In a method of simultaneously debittering and de-oiling lupine seed according to claim 2, wherein the solvent mixture is a mixture of benzene, ethyl alcohol, and water.

5. In a method of simultaneously debittering and de-oiling lupine seed according to claim 2, wherein the solvent mixture is a mixture of about 75 parts of benzene, about 21 parts of ethyl alcohol, and about 4 parts of water.

6. In a method of simultaneously debittering and de-oiling lupine seed according to claim 2, wherein the volatile base is ammonia.

7. In a method of simultaneously debittering and de-oiling lupine seed according to claim 6, wherein ammonia is present in the solvent mixture in an amount of about 1%.

8. In a method of simultaneously debittering and de-oiling oil bearing seed containing substantial amounts of bitter components, the steps comprising extracting said oil bearing seed with a mixture of two organic solvents and water, said two solvents forming with water a ternary azeotropic mixture, the water content of said solvents-water mixture not exceeding the water content of such a ternary azeotropic mixture, said solvents-water mixture containing a volatile base, and separating the extract from the extracted proteinaceous residue.

9. A proteinaceous extraction residue of lupine seed, said residue being completely free of bitter components and alkaloids and being suitable for human consumption.

WALTHER GEORG HEINRICH FORSTMANN.
GUENTHER HILLMANN.
ERICH M. H. RADDE.

REFERENCES CITED

The following references are of record in the file of this patent:

UNITED STATES PATENTS

| Number | Name | Date |
|---|---|---|
| 1,076,997 | Riddle | Oct. 28, 1913 |
| 1,607,731 | Eddy | Nov. 23, 1926 |
| 1,653,201 | Bollmann | Dec. 20, 1927 |
| 2,082,198 | Baur | June 1, 1937 |
| 2,377,975 | Singer et al. | June 12, 1945 |
| 2,384,388 | Monte et al. | Sept. 4, 1945 |
| 2,479,519 | Schopmeyer | Aug. 16, 1949 |
| 2,502,484 | Saunders | Apr. 4, 1950 |